(12) United States Patent
Hammad

(10) Patent No.: US 9,615,690 B2
(45) Date of Patent: Apr. 11, 2017

(54) SLOW COOKING APPLIANCE WITH CAMMED LID LATCHING ARRANGEMENT

(71) Applicant: Sunbeam Products, Inc., Boca Raton, FL (US)

(72) Inventor: Jamal F. Hammad, Boynton Beach, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 0 days.

(21) Appl. No.: 14/657,528

(22) Filed: Mar. 13, 2015

(65) Prior Publication Data

US 2015/0257590 A1    Sep. 17, 2015

Related U.S. Application Data

(60) Provisional application No. 61/952,531, filed on Mar. 13, 2014.

(51) Int. Cl.
*H05B 1/02* (2006.01)
*A47J 36/10* (2006.01)

(52) U.S. Cl.
CPC ..................... *A47J 36/10* (2013.01)

(58) Field of Classification Search
CPC ......... A47J 36/10; H05B 1/02; H05B 1/0261; H05B 1/0266; H05B 3/0072
USPC ............ 219/494, 497, 505, 435, 441, 445.1, 219/446.1, 412, 432, 448.11
See application file for complete search history.

(56) References Cited

U.S. PATENT DOCUMENTS

| | | | |
|---|---|---|---|
| 1,384,851 A | 7/1921 | Richardson | |
| 1,666,012 A | 4/1928 | Humphrey | |
| 1,698,929 A | 1/1929 | Wentorf | |
| 3,416,701 A | 12/1968 | Kramer et al. | |
| 3,471,054 A | 10/1969 | Ostrowsky et al. | |
| 3,518,731 A | 7/1970 | Ostrowsky et al. | |
| 3,592,352 A | 7/1971 | Shirae | |
| 4,187,412 A * | 2/1980 | Ernster | A47J 29/02 200/321 |
| 5,549,039 A | 8/1996 | Ito et al. | |
| 5,638,984 A | 6/1997 | Munari | |
| 6,824,004 B1 | 11/2004 | Wooderson | |
| D649,831 S | 12/2011 | Romandy | |
| 8,096,440 B2 | 1/2012 | Rhetat et al. | |
| 8,205,543 B2 | 6/2012 | Rhetat et al. | |
| 2005/0145615 A1 | 7/2005 | Schaffeld et al. | |
| 2007/0028781 A1* | 2/2007 | Popeil | A47J 36/10 99/407 |

(Continued)

*Primary Examiner* — Mark Paschall
(74) *Attorney, Agent, or Firm* — Michael J. Corrigan

(57) ABSTRACT

A cooking appliance including a housing and cooking vessel having a rim. A lid covers the cooking vessel when seated on the rim. At least one latch is disposed on the lid and a complementary engagement member is disposed on a sidewall of the housing. The at least one latch includes a base attached to the lid, a rotating arm having a cammed head at one end that engages the base, and a rod pivotally connected to the cammed head on one end and having a foot disposed at an opposite end. The rod passes through an aperture in the base and the cammed head engages the base as the arm is rotated. The rotation of the arm causes an axial displacement of the rod to cause a stop member on an end of the rod to engage the engagement member to seal the lid to the cooking vessel rim.

9 Claims, 3 Drawing Sheets

(56) References Cited

U.S. PATENT DOCUMENTS

2014/0076174 A1* 3/2014 Vernaglia ............... A47J 36/10
99/324

* cited by examiner

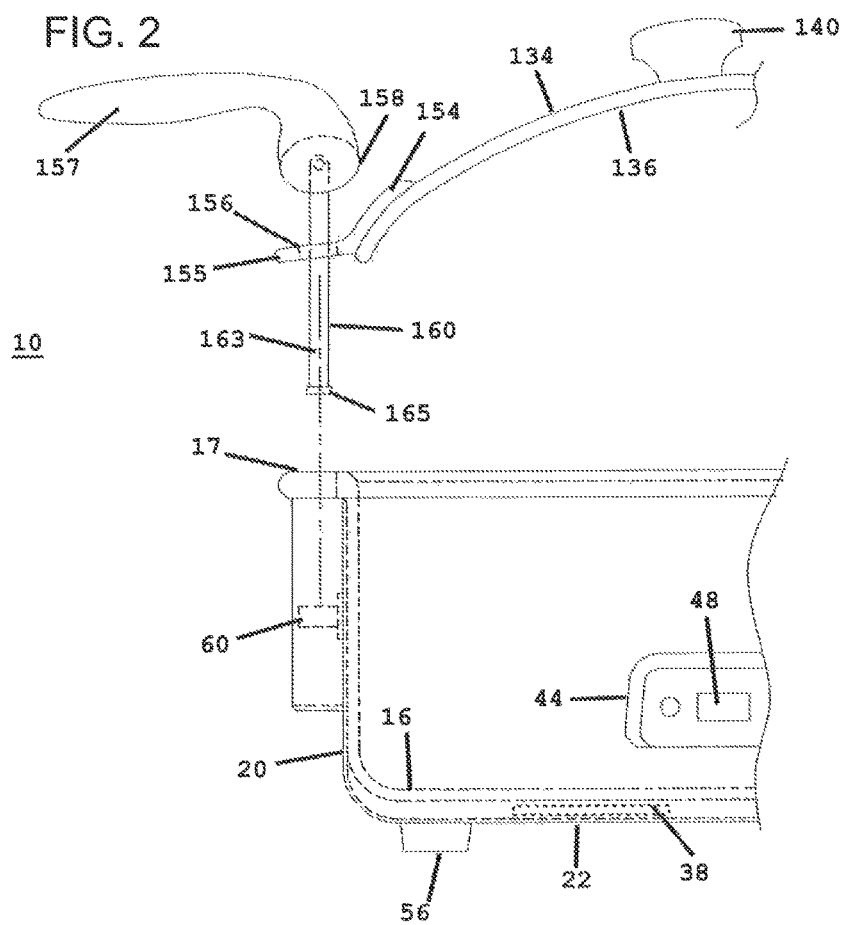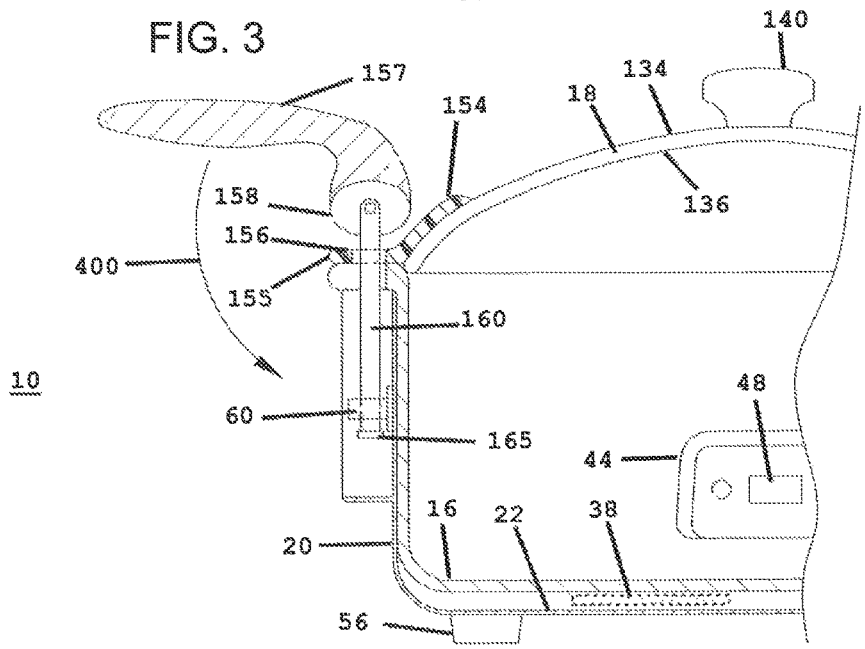

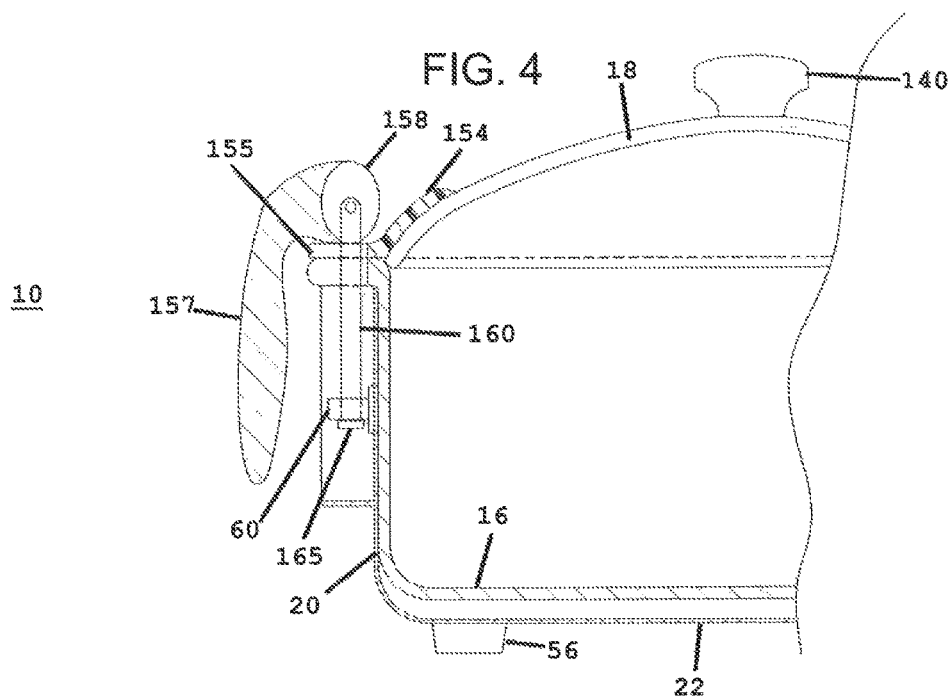
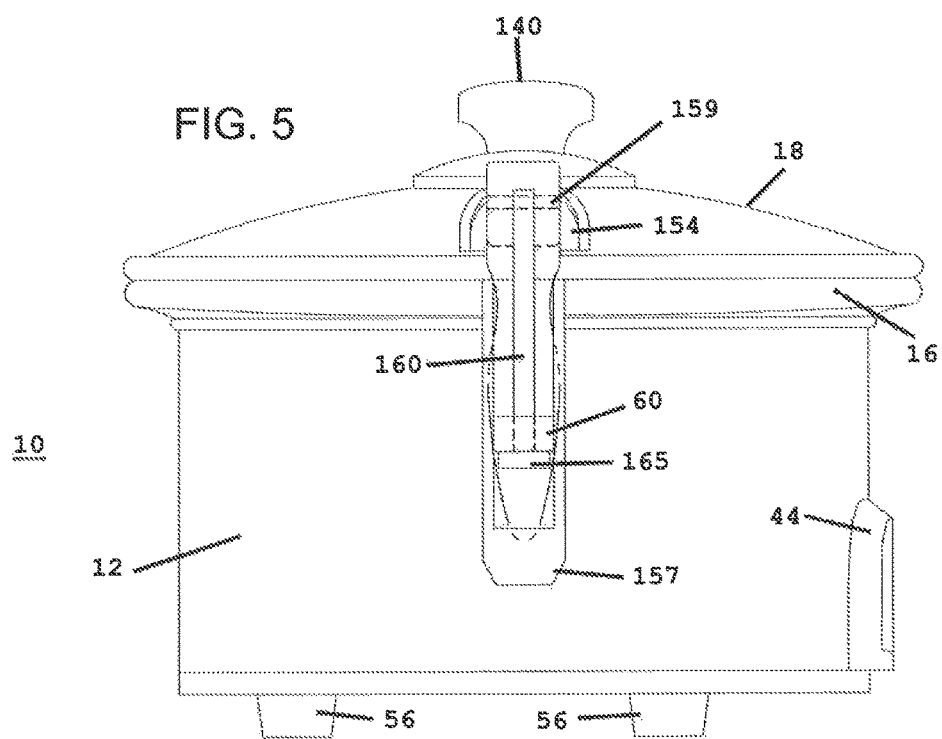

US 9,615,690 B2

SLOW COOKING APPLIANCE WITH CAMMED LID LATCHING ARRANGEMENT

CROSS-REFERENCE TO RELATED APPLICATION

This application claims benefit of U.S. Provisional Patent Application No. 61/952,531 filed on Mar. 13, 2014, which is incorporated herein by reference as if fully rewritten herein.

FIELD OF THE INVENTION

The present invention relates to a slow cooker and, in particular, to a slow cooker with at least one lid latching arrangement to secure the lid to the cooking vessel and the housing so the slow cooker can be easily transported with little to no spillage of contents therein.

BACKGROUND OF THE INVENTION

Slow cooker appliances have been broadly used in households since at least the 1970's and are commonly used for a variety of purposes. Slow cookers are convenient ways to cook a wide variety of foods including, but not limited to, soups, stews, dips, chilis, roasts, and other large cuts of meat at a lower temperature for extended periods of time, One benefit of slow cookers is that a user may add all the ingredients for a meal, namely, the meat, starches, vegetables, and so forth, together into one appliance and it will "slow cook" during the day and be ready for consumption at dinner time.

Typically, slow cookers include a ceramic or stoneware cooking vessel received in a metal housing. A transparent glass or plastic lid may be removably mounted on the cooking vessel, The housing may include electronic controls and heating element(s) for heating food stuffs placed within the cooking vessel. The housing generally has handles extending therefrom to allow a user to relatively easily grasp and move the slow cooker. Often, the user may want to move the slow cooker after it is loaded with the food stuffs to be cooked.

One drawback commonly associated with slow cookers is that the lids are not securely engaged to the cooking vessel and the housing. As such, the lid may slide off the cooking vessel when the slow cooker is being transported allowing foodstuffs to spill from the cooking vessel. Accordingly, there is a need to secure the lid to cooking vessel and housing to prevent spillage during transport.

SUMMARY OF THE INVENTION

In an embodiment, there is provided a cooking appliance including a housing, a cooking vessel having a rim, the cooking vessel being configured to be removably nestable within the housing. A lid is configured to removably cover the cooking vessel when seated on the rim. A heating element powered by a power source for heating a food product is positioned within an interior of the cooking vessel. At least one latch is disposed on the lid and a complementary engagement member disposed on a sidewall of the housing configured to selectively retain the lid lid in sealing engagement with the rim and the housing to inhibit leakage of the food stuffs from the interior of the cooking vessel. The at least one latch includes a base attached to the lid, a rotating arm having a cammed head at one end that engages the base, a rod pivotally connected to the cammed head on one end and having a foot disposed at an opposite end, the rod passing through an aperture in the base, an engagement member attached to the sidewall of the housing. The cammed head engages the pivoting arm as the pivoting arm is rotated to cause an axial displacement of the rod, and in a latched configuration the rod is pulled in a first direction causing the foot of the rod to engage the engagement member, and in an unlatched configuration the rod is urged in a second direction causing the foot of the rod to be released from the engagement member.

In an embodiment, there is provided a slow cooking appliance including a housing, a cooking vessel having a rim, the cooking vessel being configured to be removably nestable within the housing, and a lid configured to removably cover the cooking vessel when seated on the rim. A heating element is powered by a power source for heating a food product positioned within an interior of the cooking vessel. A pair of latches are disposed on opposing sides of the lid and each having a complementary engagement member disposed on opposing sides of a sidewall of the housing configured to selectively retain the lid in sealing engagement with the rim and the housing to inhibit leakage of the food stuffs from the interior of the cooking vessel. Each of the latches includes a base attached to the lid, a rotating arm having a cammed head at one end that engages the base, and a rod pivotally connected to the cammed head on one end and having a stop member disposed at an opposite end. The rod passes through an aperture in the base, and a u-shaped bracket is attached to the sidewall of the housing. The cammed head engages the rotating arm as the rotating arm is rotated to cause an axial displacement of the rod, and in a latched configuration the rod is pulled in a first direction causing the stop member of the rod to be urged against an underside of the u-shaped bracket securing the lid to the rim, and in an unlatched configuration the rod is urged in a second direction releasing the stop member from the underside of the u-shaped bracket releasing the lid from the rim.

Other aspects and advantages of the present invention will be apparent from the following detailed description of the several embodiments and the accompanying drawings.

BRIEF DESCRIPTION OF THE DRAWINGS

The accompanying drawings form a part of the specification and are to be read in conjunction therewith, in which like reference numerals are employed to indicate like or similar parts in the various views.

FIG. 2 is a partially cut-away front view of the slow cooker shown in FIG. 1;

FIG. 3 is a partial cutaway cross-sectional view of the slow cooker shown in FIG. 1 with the lid latching arrangement in an unlatched configuration;

FIG. 4 is a partial cutaway cross-sectional view of the slow cooker shown in FIG. 1 with the lid latching arrangement in a latched configuration; and FIG. 5 is a side view of the slow cooker shown in FIG. 1 with one of the lid latching arrangements in a latched configuration.

DETAILED DESCRIPTION OF THE INVENTION

Figure 1:
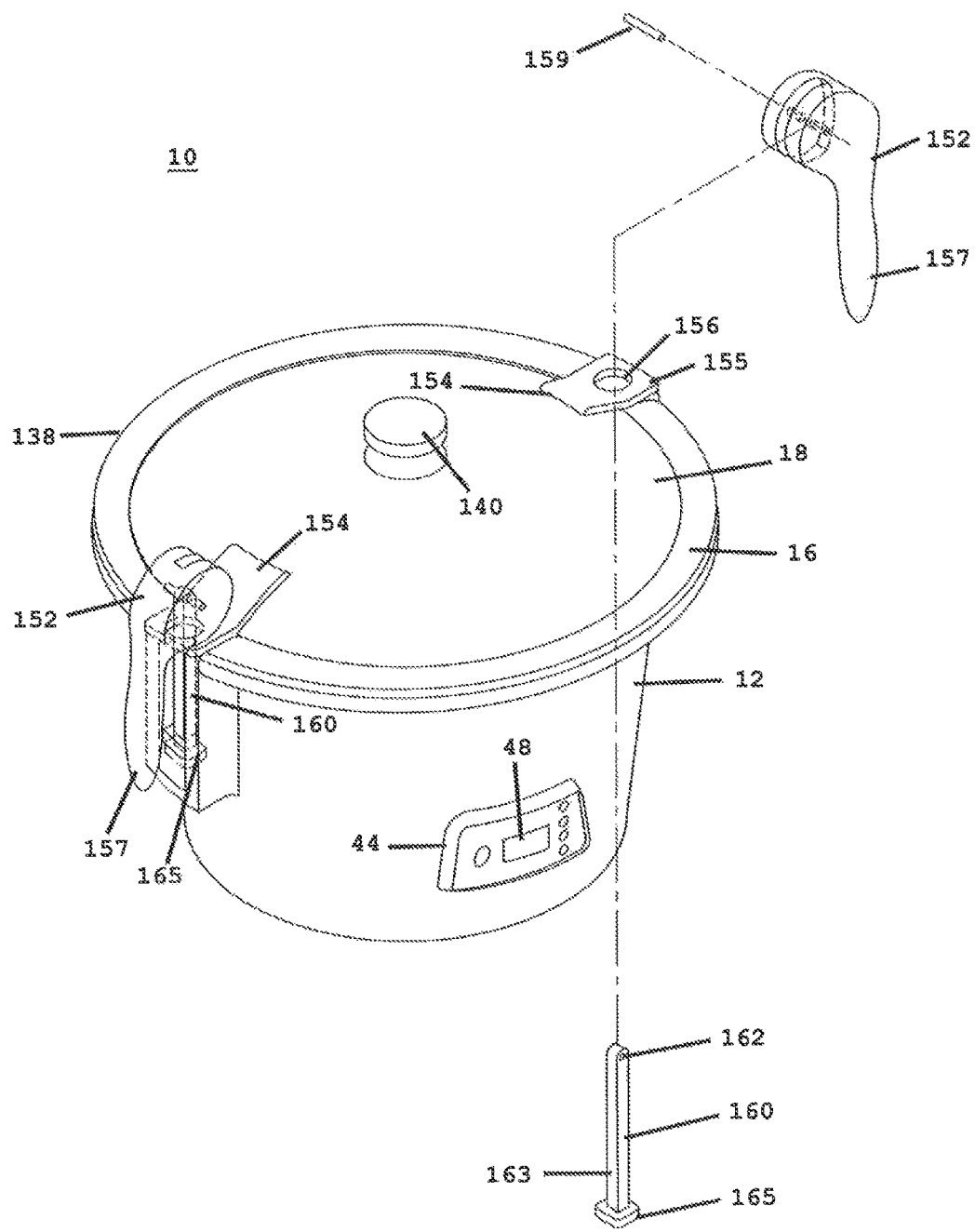
FIG. 1 is a partially exploded perspective view of one embodiment of the present slow cooker constructed in accordance with the teachings of the present invention.

The following detailed description of the present invention references the accompanying drawing figures that illustrate specific embodiments in which the invention can be practiced. The embodiments are intended to describe aspects of the present invention in sufficient detail to enable those skilled in the art to practice the invention. Other embodiments can be utilized and changes can be made without departing from the spirit and scope of the present invention. The present invention is defined by the appended claims and, therefore, the description is not to be taken in a limiting sense and shall not limit the scope of equivalents to which such claims are entitled.

Slow cooker appliances such as that disclosed herein include, but are not limited to, the slow cookers disclosed in U.S. Pat. Nos. 6,740,855, 6,587,739 and 7,312,425, all of which are incorporated herein by reference. The slow cooker of the present invention includes at least one but preferably two opposing lid latching arrangements connected to the lid for securing the lid to the slow cooker cooking vessel and housing during transport to prevent spillage.

Referring to FIGS. 1-5, there is illustrated a slow cooker 10 including, but not limited to, a housing 12, a cooking vessel 16 seated within the housing 12, and a lid 18 configured to removably seat on and cover cooking vessel 16. As best shown in FIG. 2, the housing 12 includes a sidewall 20 and a bottom wall 22. The housing 12 further includes at least one heating element 38 positioned between the cooking vessel 16 and the bottom wall 22 and/or the sidewall 20. The housing 12 may be comprised of a wide variety of materials including aluminum, stainless steel, copper, or any other known commercial alloy or other suitable material. The sidewall 20 and the bottom wall 22 are beneficial in transferring heat from housing 12 to the cooking vessel 16. Other similar and functionally equivalent materials now known or hereafter developed may be used for both the sidewall 20 and the bottom wall 22.

In an embodiment, a control panel 44 may be coupled to the sidewall 20 as shown. In the illustrated embodiment, the control panel 44 includes a plurality of electronic controls including, but not limited to, one or more of the following: an on/off switch, a timer, a cooking mode indicator, and a cooking mode switch. Slow cooker 10 is generally a standard plug-in type electrical cooking device which includes a power cord (not shown). It is however also recognized and anticipated that slow cooker 10 could be configured to be alternatively powered by some other power source. The On/Off switch turns slow cooker 10 on and off. The timer 48 may display the current time, the remaining cooking time, the actual cooking time, and/or other timer or clock features now known or hereafter developed. The cooking mode indicator displays which cooking mode or temperature range has been selected by a user through the cooking mode switch. Common examples are: low, medium, high, or warm. One embodiment includes indicators which are designated as "HI," "LO," and "WM."

Alternatively, the cooking mode indicator may display an actual cooking temperature and/or time duration to be selected by the user. The cooking mode indicator may also include an indication of cooking time ranges associated with each cooking temperature range. For example, the control panel 44 may include a cooking mode indicator that displays several operating times for each of the HI and LO settings such as preset times of 4 hours and 6 hours for the HI setting, and 8 hours and 10 hours for the LO setting. In one embodiment, slow cooker 10 may operate at a high temperature for about four (4) hours and then switch to a warming mode. One embodiment may also include a warming mode that is either (1) activated after the completion of the selected cooking mode and time duration, or (2) a separate setting chosen by the user. Still further, the mode indicator may be an LED or other light positioned next to the written description of the cooking mode, time or temperature. It is recognized and anticipated that still other settings may be used and any configuration of preset times and cooking temperatures may be incorporated into control panel 44 and slow cooker 10 and all such variations are intended to be within the scope of the present invention.

Referring in particular now to FIG. 4, in an embodiment the housing 12 may include u-shaped brackets 60 or other engagement members 60 that are configured to engage one or more of the latching arrangements 152 associated with the lid 18 for securing the lid 18 to the housing 12 as will be further described below. As further illustrated in FIG. 3, the lid 18 includes an outer surface 134, an inner surface 136, an annular rim 138, and a handle 140. The annular rim 138 of the lid 18 is configured to rest upon a rim 17 of the cooking vessel 16. When the annular rim 138 of the lid 18 rests upon the rim 17, the cooking vessel 16 is substantially enclosed thereby capturing neat and moisture which assists the cooking process. The handle 140 may be coupled to or otherwise attached to the outer surface 134 of lid 18 through the use of a fastener (not shown). Another embodiment (not shown) may include a lid 18 having the handle 140 integrally formed therewith.

The lid 18 may further include at least one latching arrangement 152 and preferably two latching arrangements 152 as shown in FIG. 1 on diametrically opposing sides of the lid 18 proximate the annular rim 17 of the cooking vessel 16. Each lid latching arrangement 152 may include a base 154 secured to the lid 18 with a fastener which may be any type of fastener such as a rivet, screw, adhesive, etc., as is known to one of ordinary skill. The base 154 may include an angled cantilever portion 155 extending over the rim 17 of the cooking vessel 16. The base 154 may also include an annular portion 156 formed in the cantilever portion 155 for receiving and allowing a. tie down rod 160 to pass therethrough. The tie down rod 160 is preferably formed from a food grade material including but not limited to plastic, metal, or an elastomer. A first end 162 of the tie down rod 160 may be pivotally secured to a lever 157 with a pin 159 inserted into a bore formed in the lever 157. Another bore in the first end 162 of tie down 160 receives the pin 157 for pivotally securing the tie down rod 160 to the lever 157 and the tie down rode 160. The lever 157 includes a cammed portion 158 which facilitates securing the lid 18 to the housing 12 as described in more detail below.

A foot or stop member 165 is connected to an opposite end or second end 163 of the tie down rod 160. The foot 165 of the tie down rod 160 engages a cutout portion 63 of a u-shaped bracket 60 attached to the housing 12. The foot 165 may be square or annular shaped or any other shape. The u-shaped bracket 60 may be attached to the sidewall 20 of the housing 12 by a fastener such as rivet or other means such as welding as is known to one of ordinary skill in the art. When the lever 157 is moved in the direction of arrow 400 (FIG. 3), the rammed portion 158 engages the cantilever portion 155 of the base 154 to cause an upward axial force to be applied to the tie down rod 160. When the lever 157 is moved to the position shown in FIG. 4, the movement of the lever 157 causes the foot 165 of the tie down rod 160 to be urged against the underside of the u-shaped bracket 60 which tightly pulls one side of the lid 18 against the cooking vessel 16 and the housing 12. Moving the lever 157 to this position on the latching arrangement 152 disposed on the opposite side of the lid 18 similarly causes the lid 18 to be tightly pulled against the cooking vessel 16 and the housing 12 causing a fluid tight seal.

Oppositely, when the lever 157 is moved in the opposite direction of arrow 400 the foot 165 of the tie down rod 160 is released from the underside of the u-shaped bracket 60 releasing the lid 18 from the cooking vessel 16 and the housing 12.

Thus, there has been shown and described several embodiments of a novel slow cooker with a latching arrangement for securing the lid to the cooking vessel and housing. Many changes, modifications, variations and other uses and applications of the present invention will, however, become apparent to those skilled in the art after considering this specification and the accompanying drawings. All such drawings, modifications, variations and other uses and applications which do not depart from the spirit and scope of the present invention are deemed to be covered by the present invention which is limited only by the claims which follow.

What is claimed is:

1. A cooking appliance, comprising:
a housing;
a cooking vessel having a rim, the cooking vessel being configured to be removably nestable within the housing;
a lid configured to removably cover the cooking vessel when seated on the rim;
a heating element powered by a power source for heating a food product positioned within an interior of the cooking vessel; and
at least one latch disposed on the lid and a complementary engagement member disposed on a sidewall of the housing configured to selectively retain the lid lid in sealing engagement with the rim and the housing to inhibit leakage of the food stuffs from the interior of the cooking vessel, the at least one latch including:
a base attached to the lid;
a rotating arm having a cammed head at one end that engages the base;
a rod pivotally connected to the cammed head on one end and having a foot disposed at an opposite end, the rod passing through an aperture in the base; and
the engagement member attached to the sidewall of the housing;
wherein the cammed head engages the rotating arm as the rotating arm is rotated to cause an axial displacement of the rod, and in a latched configuration the rod is pulled in a first direction causing the foot of the rod to engage the engagement member, and in an unlatched configuration the rod is urged in a second direction causing the foot of the rod to be released from the engagement member.

2. The appliance of claim 1, wherein said lid further includes a gasket around an outer edge thereof for sealing engagement with the rim.

3. The appliance of claim 1, wherein the stop member is a square shaped and formed on one end of the elastic tie down.

4. The appliance of claim 1, wherein the rod is formed from an elastomer selected from the group consisting of plastic, metal, and an elastomer.

5. The appliance of claim 1, wherein the engagement member is a u-shaped bracket having a cutout portion and an underside beneath the cutout portion that abuts the foot of the elastic tie down when in the latched configuration.

6. A slow cooking appliance, comprising:
a housing;
a cooking vessel having a rim, the cooking vessel being configured to he removably nestable within the housing;
a lid configured to removably cover the cooking vessel when seated on the rim;
a heating element powered by a power source for heating a food product positioned within an interior of the cooking vessel;
a pair of latches disposed on opposing sides of the lid and each having a complementary engagement member disposed on opposing sides of a sidewall of the housing configured to selectively retain the lid in sealing engagement with the rim and the housing to inhibit leakage of the food stuffs from the interior of the cooking vessel, each of the latches including:
a base attached to the lid;
a rotating arm having a cammed head at one end that engages the base;
a rod pivotally connected to the cammed head on one end and having a stop member disposed at an opposite end, the rod passing through an aperture in the base;
the engagement member is a u-shaped bracket attached to the sidewall of the housing;
wherein the cammed bead engages the rotating arm as the rotating arm is rotated to cause an axial displacement of the rod, and in a latched configuration the rod is pulled in a first direction causing the stop member of the rod to be urged against an underside of the u-shaped bracket securing the lid to the rim, and in an unlatched configuration the rod is urged in a second direction releasing the stop member from the underside of the u-shaped bracket releasing the lid from the rim.

7. The appliance of claim 6, wherein the lid further includes a gasket around an outer edge thereof for sealing engagement with the cooking vessel rim.

8. The appliance of claim 6, wherein the stop member is square shaped and formed on one end of the elastic tie down.

9. The appliance of claim 6, wherein the rod is formed from a material selected from the group consisting of plastic, metal, and an elastomer.

* * * * *